US012795412B2

(12) United States Patent
Shi et al.

(10) Patent No.: US 12,795,412 B2
(45) Date of Patent: Nov. 10, 2026

(54) SD-WAN FABRIC BUNDLED WITH A SELF-TEST SYSTEM

(71) Applicant: Cisco Technology, Inc., San Jose, CA (US)

(72) Inventors: Sishi Shi, Shanghai (CN); Jianda Liu, Shanghai (CN); Wei Zhou, Changsha (CN); Yicheng Samuel Liu, Shanghai (CN); Alan Xiao-rong Wang, Shanghai (CN); Qiang Wang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 18/783,953

(22) Filed: Jul. 25, 2024

(65) Prior Publication Data

US 2025/0324290 A1 Oct. 16, 2025

Related U.S. Application Data

(60) Provisional application No. 63/632,035, filed on Apr. 10, 2024.

(51) Int. Cl.
*H04W 24/06* (2009.01)
*H04W 24/10* (2009.01)

(52) U.S. Cl.
CPC .......... *H04W 24/06* (2013.01); *H04W 24/10* (2013.01)

(58) Field of Classification Search
CPC .............................. H04W 24/06; H04W 24/10
See application file for complete search history.

(56) References Cited

U.S. PATENT DOCUMENTS 11,552,874 B1 * 1/2023 Pragada .................. H04L 43/08
2015/0234725 A1 8/2015 Cillis et al.
2017/0109260 A1 4/2017 Wang et al.
2019/0104047 A1 4/2019 Tejaprakash et al.
2019/0109777 A1 4/2019 Mircescu
2020/0004665 A1 1/2020 Shinge et al.
2024/0095158 A1 3/2024 Miriyala et al.

FOREIGN PATENT DOCUMENTS

CN 112214258 B * 8/2022 ............ H04L 43/50

* cited by examiner

*Primary Examiner* — Derrick V Rose
(74) *Attorney, Agent, or Firm* — Polsinelli P.C.

(57) ABSTRACT

A method is disclosed for performing testing of network deployment by an SD-WAN controller. The method includes receiving, by an SD-WAN controller, a request to configure a test package comprising a set of test instructions for transmitting test traffic between a first and second edge network device. The method includes configuring the test package at the first and the second edge network device, wherein the test package instructs the first edge network device and the second edge network device to conduct a test based on the set of test instructions in the test package and the test traffic. The set of test instructions includes instructions for scheduling the test to initiate at a specified time period; and monitoring the test traffic between the first edge network device and the second edge network device, wherein monitoring includes collecting one or more metrics related to the test traffic transmitted.

20 Claims, 4 Drawing Sheets

SD-WAN FABRIC BUNDLED WITH A SELF-TEST SYSTEM

CROSS-REFERENCE TO RELATED APPLICATIONS

This application claims priority to U.S. provisional application No. 63/632,035, filed on Apr. 10, 2024, which is expressly incorporated by reference herein in its entirety.

FIELD OF THE TECHNOLOGY

The present technology relates to the field of network communication and routing technologies, specifically addressing Software-Defined Wide Area Network (SD-WAN) technologies that encompass methods for a self-test network solution for testing during network deployment by a network controller.

BACKGROUND

SD-WAN represents an approach to networking that leverages software-defined networking (SDN) principles to enhance the management and operation of wide area networks (WAN). A key aspect of SD-WAN is its ability to analyze routes of paths within the network, helping network operators monitor and troubleshoot effectively. By decoupling networking hardware from its control mechanism, SD-WAN enables centralized control and orchestration of network traffic flows across geographically dispersed locations.

This centralized management provides network operators with an end-to-end view of the entire SD-WAN network and the paths taken by application data traffic as it travels between edge network devices. SD-WAN dynamically routes network traffic across multiple pathways, including Multiprotocol Label Switching (MPLS), broadband Internet, and cellular connections, based on real-time conditions and application requirements. SD-WAN controllers can intelligently direct traffic through real-time analysis and policy-based routing, ensuring optimal performance and reliability. The comprehensive visibility into the network paths traversed by data traffic enables proactive monitoring and efficient troubleshooting of routes and transmission paths between edge network devices. This enhances performance, reliability, and security across the organization's branch offices, data centers, and cloud resources.

BRIEF DESCRIPTION OF THE SEVERAL VIEWS OF THE DRAWINGS

In order to describe the manner in which the features of the disclosure can be obtained, a more description of the principles of the present technology will be rendered by reference to aspects thereof which are illustrated in the appended drawings. Understanding that these drawings depict exemplary aspects of the disclosure and are not therefore to be considered to be limiting of its scope, the principles herein are described and explained with additional specificity and detail through the use of the accompanying drawings in which.

DETAILED DESCRIPTION

Figure 1:
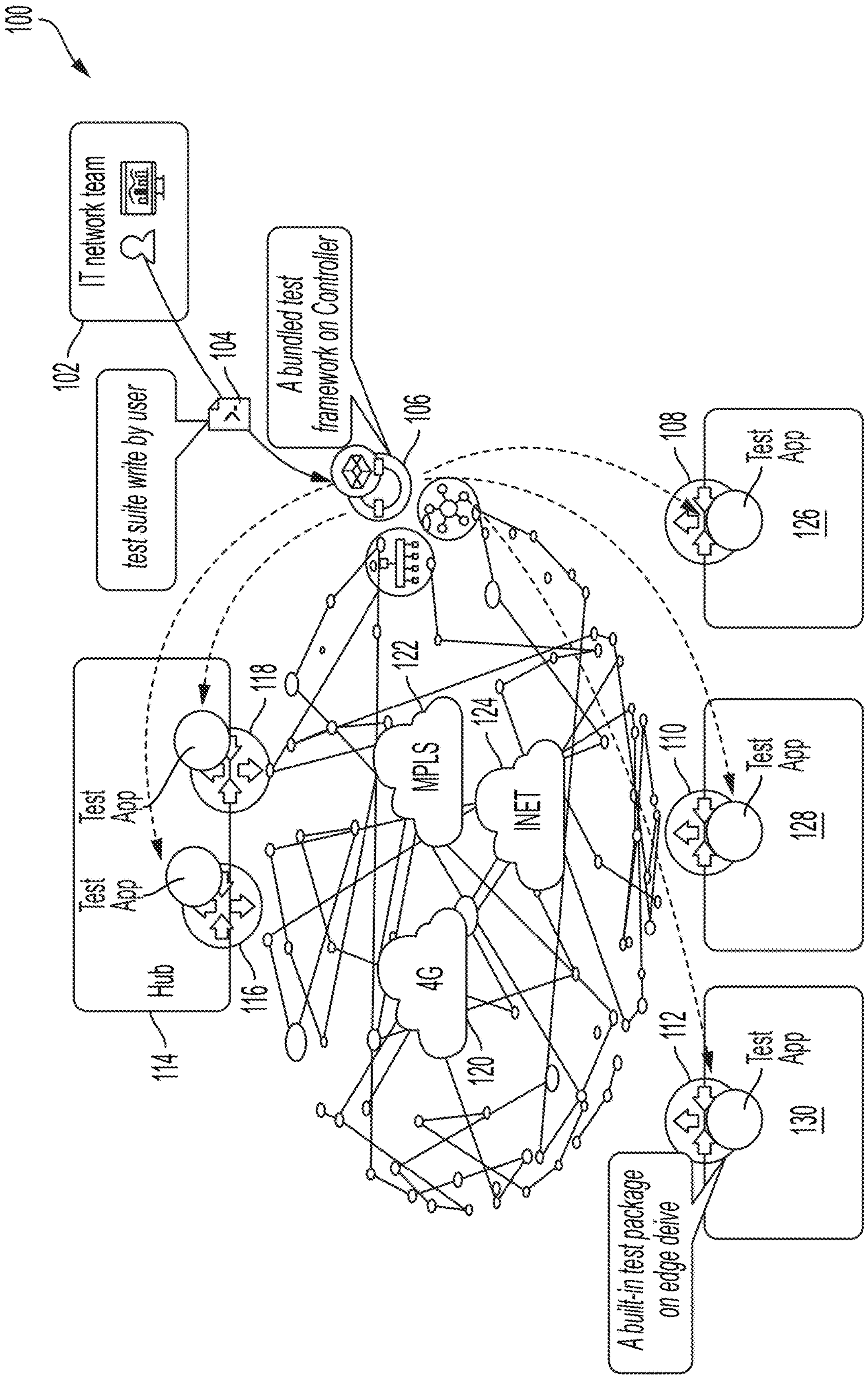
FIG. 1 illustrates an example SD-WAN network architecture for managing test packages according to some aspects of the disclosure.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative, and is not intended to further limit the scope and meaning of the disclosure or of any example term. Likewise, the disclosure is not limited to various embodiments given in this specification.

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The disclosed technology integrates network design, functional implementation, and verification into a cohesive system. The network devices within the proposed system can function as both forwarding nodes and test instruments during the early deployment stages. When newly deployed or during maintenance, these devices have idle CPU, memory, and I/O resources, which can be utilized for testing. SD-WAN network controllers can feature a programmable test system capable of managing all edge network devices and orchestrating test workflows based on pre-programmed test suite codes. Each network device includes a test package managed by the SD-WAN network controllers that can generate test traffic flows. Enterprise network administrators can then schedule test tasks within the test package to be carried out on each edge network device and obtain a comprehensive test report upon completion.

In some aspects, the techniques described herein relate to a method for performing testing of network deployment in a software-defined wide area network (SD-WAN), the method including: receiving, by an SD-WAN controller, a request to configure a test package including a set of test instructions for transmitting test traffic between a first edge network device and a second edge network device; configuring, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitoring the test traffic between the first edge network device and the second edge network device, wherein monitoring includes collecting data from the test traffic, the data including one or more metrics related to the test traffic transmitted.

In some aspects, the techniques described herein relate to a method, further including: instructing, by the SD-WAN controller, the first edge network device and the second edge network device to generate data traffic flows in accordance with the test package, wherein traffic flows of the test traffic are monitored to generate the one or more metrics related to the test traffic transmitted.

In some aspects, the techniques described herein relate to a method, wherein the SD-WAN controller interfaces with one or more application programming interfaces (APIs) or a user interface to receive the request to configure the test package and to provide results of the one or more metrics to a network administrator in an SD-WAN.

In some aspects, the techniques described herein relate to a method, wherein the one or more metrics are determined by a network traffic meter in the test package deployed on the first edge network device and the second edge network device by the SD-WAN controller, the network traffic meter configured to facilitate sending of data traffic flows, reception of the data traffic flows, and measure the data related to sending and receiving according to one or more instructions from the SD-WAN controller.

In some aspects, the techniques described herein relate to a method, wherein the first edge network device and the second edge network device are configured to report the data related to the sending and the receiving of the data traffic flows to the SD-WAN controller to identify one or more values related to the one or more metrics.

In some aspects, the techniques described herein relate to a method, wherein the one or more metrics include a measurement of loss, jitter or latency of data traffic generated by the first edge network device or the second edge network device.

In some aspects, the techniques described herein relate to a method, further including: wherein the test traffic generated by the first edge network device is configured to simulate network, transport, and application layer protocols, and control a bit rate per second of the test traffic transmitted.

In some aspects, the techniques described herein relate to a method, wherein instructing the first edge network device to conduct the test includes: identifying a test command in the test package received from the SD-WAN controller over a management network path, the test command including a set of instructions for conducting the test along a multiprotocol label switching link (MPLS link) to the second edge network device; and sending the test traffic based on the test command to the second edge network device over the MPLS link, wherein the second edge network device is to forward the test traffic received to the test package stored at the second edge network device.

In some aspects, the techniques described herein relate to a method, wherein instructing the first edge network device to conduct the test includes: deploying the test package by the SD-WAN controller on the first edge network device and the second edge network device that includes a device configuration instruction; wherein the device configuration instruction instructs the first edge network device and the second edge network device to configure and deploy an SD-WAN that includes a data link between the first edge network device and the second edge network device; and implementing a routing policy that identifies a set of traffic to transmit over the data link to the second edge network device, wherein the routing policy instructs the second edge network device to identify data received in the set of traffic.

In some aspects, the techniques described herein relate to a method, further including: in response to collecting the one or more metrics related to the test traffic transmitted, transmitting to the SD-WAN controller the one or more metrics reported by the first edge network device and the second edge network device after a predetermined sleep time period.

In some aspects, the techniques described herein relate to a network device including: one or more memories having computer-readable instructions stored therein; and one or more processors configured to execute the computer-readable instructions to: receive, by an SD-WAN controller, a request to configure a test package including a set of test instructions for transmitting test traffic between a first edge network device and a second edge network device; integrating, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitor the test traffic between the first edge network device and the second edge network device, wherein monitoring includes collecting data from the test traffic, the data including one or more metrics related to the test traffic transmitted.

In some aspects, the techniques described herein relate to a non-transitory computer-readable storage medium including computer-readable instructions, which when executed by one or more processors of a network appliance, cause the network appliance to: receiving, by an SD-WAN controller, a request to configure a test package including a set of test instructions for transmitting test traffic between a first edge network device and a second edge network device; integrating, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitoring the test traffic between the first edge network device and the second edge network device, wherein monitoring includes collecting data from the test traffic, the data including one or more metrics related to the test traffic transmitted.

EXAMPLE EMBODIMENTS

Additional features and advantages of the disclosure will be set forth in the following description and, in part, will be apparent from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Enterprise network administrators deploy software projects to enhance network performance, ensure security, automate operations, support business-critical applications, and comply with industry regulations. These projects include optimization tools, security applications, and automation software that streamline tasks and reduce human error. They also provide scalability, flexibility, and improved user experience by managing bandwidth allocation and prioritizing critical applications. Additionally, deploying software projects leads to cost savings through efficient network management and proactive maintenance, ensuring a robust, secure, and high-performing network infrastructure that meets evolving business needs.

Enterprise software projects typically include a self-test subsystem to ensure system robustness and to perform a brief sanity check before taking on workload in a production environment. However, once a network solution proposed by network manufacturers is deployed in an enterprise, the verification of this network fabric depends on third-party test instruments, test solutions, and network engineers within the enterprise. This separation means that the design, implementation, and verification of a network solution are not only split between different systems, such as network devices and third-party test instruments, but also between different communities and companies. This fragmented approach delays the efficiency of troubleshooting network issues and providing solutions in a timely manner. The reliance on third-party tools and separate verification processes can lead to increased complexity, higher costs, and extended downtime, hindering the overall effectiveness and reliability of the enterprise network.

The current state-of-the-art in network solution deployment involves separate teams responsible for design, implementation, and testing. This approach is inefficient and does not leverage best practices from other fields such as software development, where products are designed and tested concurrently by a single team. Thus, this present technology relates to integrating the validation and testing process with the deployment of network solutions.

In contrast to current technologies, this present technology aims to integrate the validation and testing process with the deployment of network solutions, drawing inspiration from successful projects in the IT field like Linux and Python. By doing so, we can create a cohesive whole that streamlines the entire process.

The present technology embeds a test package within network device nodes, which possess basic functions similar to those found in professional testing instruments, such as traffic generation and statistical analysis capabilities. Additionally, this test package should be able to communicate with a central control node for receiving instructions and reporting results.

Furthermore, the present technology includes a control module integrated into the central control node that schedules and controls the test packages on each device node. This ensures efficient and coordinated testing across all nodes in the network solution.

To enhance usability, a programmable test framework is also integrated into the central control node, allowing for flexible adaptation to different user scenarios and deployment configurations. By providing this level of customization, the present technology can accommodate diverse use cases while maintaining a unified testing approach.

The present technology thus addresses the need for an integrated validation and testing process that is tightly coupled with network solution deployment, enabling more efficient and effective product development in the field of networking.

FIG. 1 illustrates an example SD-WAN network architecture 100 for managing test packages according to some aspects of the disclosure.

The SD-WAN network architecture 100 includes multiple edge network devices, specifically edge network devices 108, 110, 112, 116, and 118, a network hub 114, and an SD-WAN controller 106. This architecture creates an overlay SD-WAN network on top of various connectivity options, such as 4G 120, Multiprotocol Label Switching (MPLS) 122, and INET 124 services. Centrally managed by the SD-WAN controller, the edge network devices 108, 110, 112, 116, and 118 are configured with test code within a test package for transmitting test traffic flows according to the test packages received by the SD-WAN network controller.

The test code can be managed by the SD-WAN controller 106, which can generate test traffic flows. In some examples, the test code can be programmed, deployed, and installed in the SD-WAN controller 106 through a software update. The test code, as deployed on the SD-WAN controller 106, is responsible for generating test traffic and reporting test metrics received from edge network devices 108, 110, 112, 116, and 118.

SD-WAN controller 106 based on configurations deployed by network administrators 102 can schedule test tasks for edge network devices 108, 110, 112, 116, and 118 within a test suite 104. Upon implementation of the test suite 104, edge network device 108, 110, 112, 116, and 118 can transmit a report containing one or more metrics from the tests instructed to perform by the SD-WAN controller 106. The test suite 104 can include test code configured by the network administrator 102 and provide a network interface to configure the test code via SD-WAN controller 106. In some examples, the interface can be accessible via one or more APIs or a user interface.

Once a test is configured by network administrator 102 and deployed to the SD-WAN controller 106, SD-WAN controller 106 communicates the test configuration and test instructions for performing tests to the relevant edge devices and routers. SD-WAN controller 106 then deploys a test package, which includes the test suite 104, to edge network devices 108, 110, 112, 116, and 118 across the SD-WAN network, including those hosted by branch 126, branch 128, and branch 130. The test package, configured by the network administrators 102, instructs the edge network devices 108, 110, 112, 116, and 118 to perform tests, which involve sending test traffic from one edge network device to another through a designated network path in the SD-WAN. For example, edge network device 108, may send test traffic in accordance with the test package to edge network device 110, and vice versa.

In some examples, the test package on the edge network devices 108, 110, 112, 116, and 118 can be launched and terminated by the SD-WAN controller 106 with one or more conditional privileges. The SD-WAN controller 106 can start the test package based on the test suite 104, indicating a start time for the test package on at least one edge network device 108, 110, 112, 116, and 118, and terminate the test at an end time indicated by the test package.

In some examples, the test package transmitted to the edge network devices 108, 110, 112, 116, and 118 can include a traffic generator that includes capabilities to generate traffic that can simulate all network, transport, and application layer protocols. In some examples, SD-WAN controller 106 is able to regulate the bandwidth of the traffic flow transmitted by one or more of the edge network devices 108, 110, 112, 116, and 118.

In some examples, SD-WAN controller 106 can assess and report important performance metrics such as packet loss, jitter, and latency between at least two of the edge network devices 108, 110, 112, 116, and 118. The performance metrics are determined by a network traffic meter in the test package deployed on a first edge network device and a second edge network device by the SD-WAN controller 106. For example, any of edge network devices 108, 110, 112, 116, and 118. The network traffic meter can be configured to facilitate the sending and receiving of data traffic flows and measure statistical data related to the transmission of the data flows according to one or more instructions from the SD-WAN controller 106. The edge network devices 108, 110, 112, 116, and 118 can report the statistical data to the SD-WAN controller 106, where SD-WAN controller 106 calculates the performance metrics.

Figure 2:
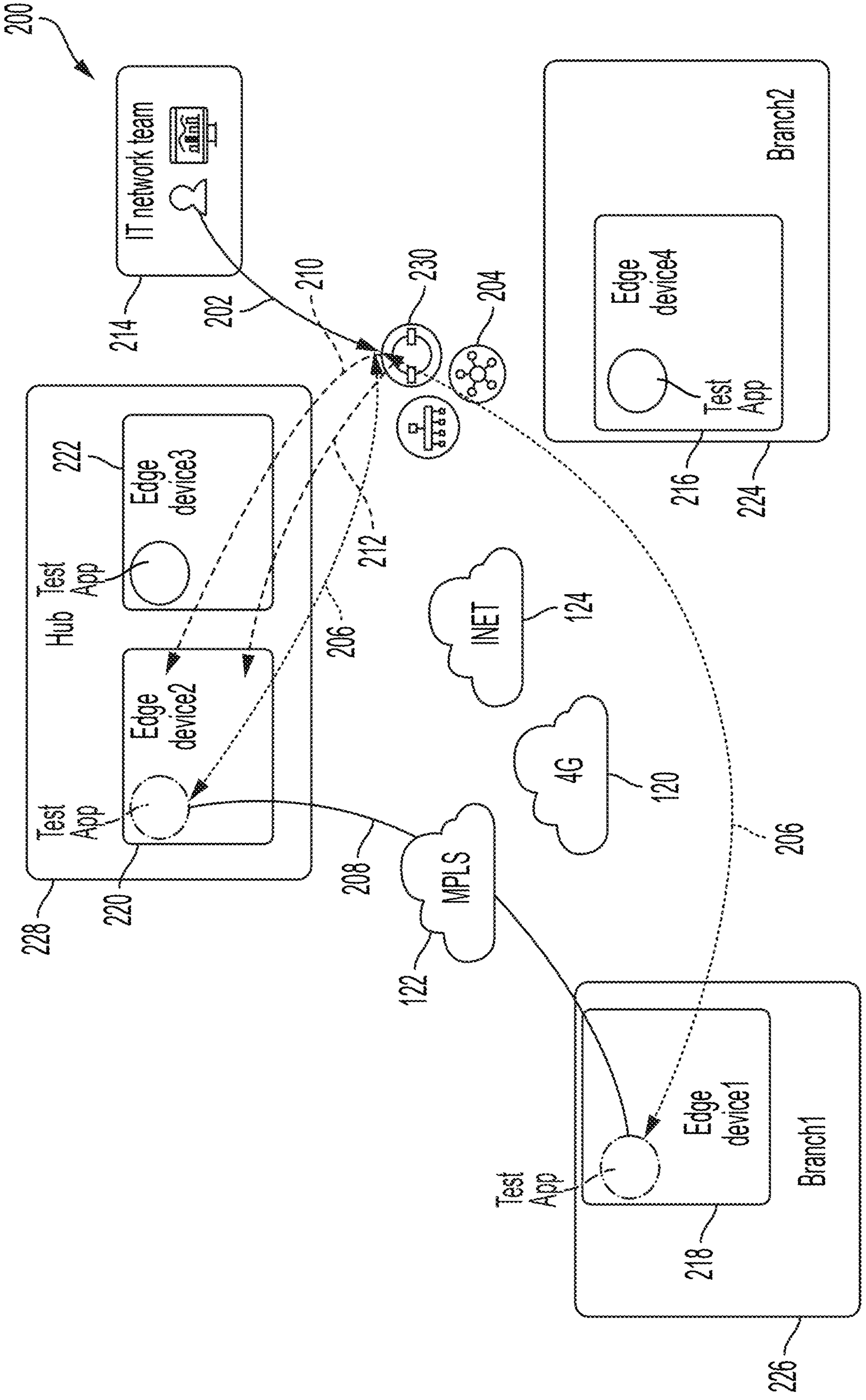
FIG. 2 illustrates an example process for an SD-WAN network architecture 200 for network deployment of a test package to edge network devices according to some aspects of the disclosure.

FIG. 2 illustrates an example process for an SD-WAN network architecture 200 for network deployment of a test package to edge network devices according to some aspects of the disclosure.

In step 202, network administrator 214 is responsible for configuring a test suite, which includes test code written and prepared by the network administrator 214 based on a test framework available in the SD-WAN controller 230.

The network administrator 214 prepares the test suite to be transmitted to the SD-WAN controller 230, which serves as the central management entity for orchestrating the test execution. Once received by the SD-WAN controller 230, the test suite is deployed to the relevant network edge devices. These include edge network devices 216 hosted by branch 224, edge network device 218 hosted by branch 226, and network edge devices 220 and 222 hosted in network hub 228. SD-WAN controller 230 initiates the test package on these devices, starting the test and generating traffic flows as specified in the test suite.

The configurations of the test package, as set by the network administrator 214, define precise parameters for traffic flow generation at edge network device 218. These parameters include the source IP address and port, the destination IP address and port, the protocol to be used, and the desired bandwidth (bps) of the traffic flow.

The test package configurations also specify the test traffic forward mode to be utilized by edge network device 218. There are two modes available for forwarding test traffic. The first mode is based on the current route in the network fabric, allowing the traffic to follow the existing network paths. The second mode causes the network fabric to automatically configure specific routing behaviors and scenarios for the test traffic.

Furthermore, the test configurations instruct edge network device 218 to verify all data packets in the test traffic. This verification process ensures that all packets sent from the test package on edge network device 218 are received correctly on edge network device 220.

In step 204 of the process, the SD-WAN controller 230 can load the test suite received from the network administrator 214 into its test framework system and orchestrate a task list as specified in the configurations of the test suite. This step ensures the test suite is properly integrated and executed across the network.

In step 206, SD-WAN controller 230 begins by initiating a first instruction in the task list, which involves instructing the edge network device 218 to launch the test package and activate the test package at edge network device 220.

The second instruction in the task list can direct SD-WAN controller 230 to instruct edge network device 220 to launch the test package once activated.

The third instruction instructs SD-WAN controller 230 to determine if the test traffic forward mode is set to the first mode. If the first mode is selected, SD-WAN controller 230 sends the test information to edge network device 220. This ensures that the test traffic received by edge network device 220 is forwarded to its built-in test package for processing.

In the fourth instruction in the task list, the SD-WAN controller 230 can assess whether the test traffic forward mode is set to the second mode. If the second mode is selected, at step 208, SD-WAN controller 230 sends both test information and route details to edge network device 218, instructing edge network device 218 to send the test traffic to edge network device 220 over an MPLS link. At step 210, SD-WAN controller 230 can send information to edge network device 220, informing edge network device 220 that the incoming test traffic from edge network device 218 should be forwarded to its built-in test package.

The fifth instruction in the task list involves SD-WAN controller 230 instructing edge network device 218 to create the test traffic and send the test traffic to edge network device 220, at step 212. This step initiates the actual data transmission, enabling the test to commence.

After a predetermined sleep time has expired, the sixth instruction instructs edge network device 218 and edge network device 220 to report the collected data from the tests ran on the test traffic back to SD-WAN controller 230.

In some examples, upon completion of the tests, SD-WAN controller 230 terminates the test packages on edge network device 218 and edge network device 220, and can consolidate the test results into a report that is transmitted to network administrator 214. This report can then be analyzed by the network administrator 214, who uses the insights gained to make informed decisions about network optimization for troubleshooting.

Figure 3:
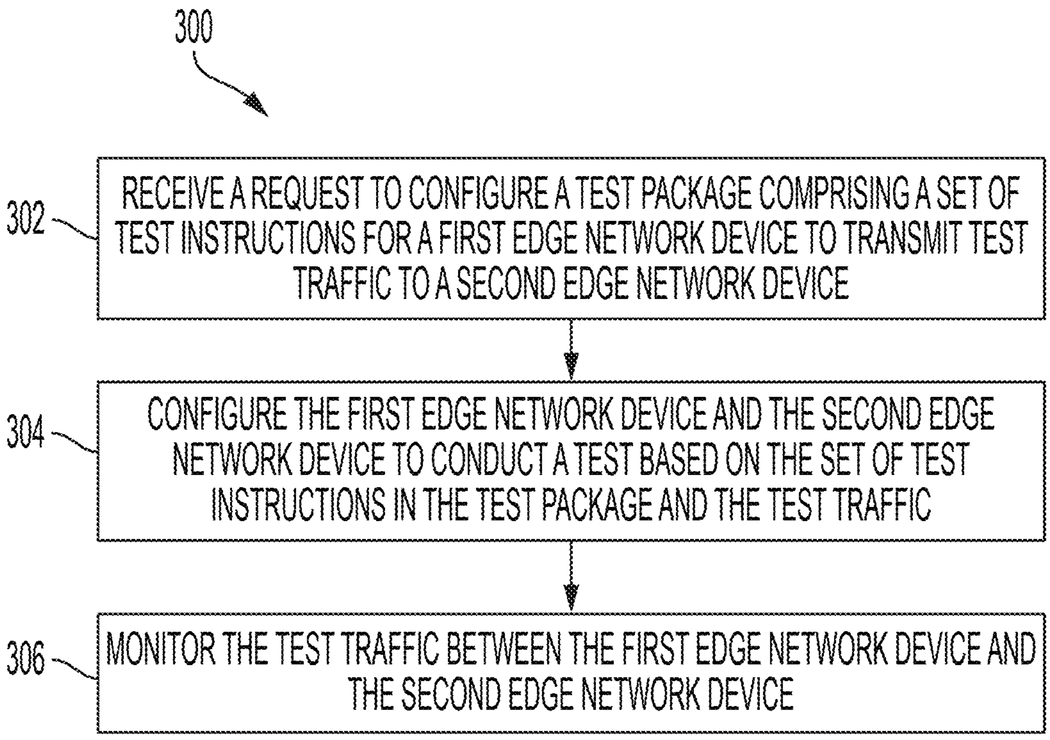
FIG. 3 illustrates an example process for a network controller to perform testing during a network deployment according to some aspects of the disclosure.

FIG. 3 illustrates an example process for a network controller to perform testing during a network deployment according to some aspects of the disclosure. Although the example process 300 depicts a particular sequence of operations, the sequence may be altered without departing from the scope of the present disclosure. For example, some of the operations depicted may be performed in parallel or in a different sequence that does not materially affect the function of the process 300. In other examples, different components of an example device or system that implements the process 300 may perform functions at substantially the same time or in a specific sequence.

According to some examples, the method includes receiving a request to configure a test package comprising a set of test instructions for transmitting test traffic between a first edge network device and a second edge network device at block 302. For example, the SD-WAN controller 230 illustrated in FIG. 2 may receive a request to configure a test package comprising a set of test instructions for transmitting test traffic between a first edge network device and a second edge network device. The SD-WAN controller interfaces with one or more application programming interfaces (APIs) or a user interface to process the request and configure the test package accordingly.

According to some examples, the method includes configuring the test package at the first edge network device and the second edge network device at block 304. For example, the SD-WAN controller 230 illustrated in FIG. 2 may integrate or configure the test package at the first edge network device and the second edge network device. The test package instructs both edge network devices to conduct a test based on the set of test instructions and the test traffic specified within the package. The test package is configured to execute the test according to the configurations outlined in the set of test instructions, which include scheduling the test to initiate at a specified time. The SD-WAN controller instructs the first edge network device and the second edge network device to generate data traffic flows in accordance with the test package. This process involves identifying a test command in the test package received from the SD-WAN controller over a management network path. The test command includes instructions for conducting the test along a multiprotocol label switching (MPLS) link to the second edge network device.

Instructing the first edge network device to conduct the test comprises sending the test traffic based on the test command to the second edge network device over the MPLS link. This includes deploying the test package by the SD-WAN controller on both edge network devices, with a device configuration instruction that guides the setup and deployment of an SD-WAN data link between the two devices. The routing policy, implemented as part of the test command, identifies a set of traffic to transmit over the data link to the second edge network device and instructs it to determine the amount of data received in this set of traffic. The second edge network device then forwards the test traffic received to its stored test package. The traffic flows of the test traffic are monitored to generate one or more metrics related to the transmitted traffic. The test traffic generated by the first edge network device is configured to simulate network, transport, and application layer protocols and control the bit rate per second (bps) of the test traffic transmitted.

According to some examples, the method includes monitoring the test traffic between the first edge network device and the second edge network device at block 306. For example, the SD-WAN controller 230 illustrated in FIG. 2 may monitor the test traffic between the first edge network device and the second edge network device. This monitoring includes collecting data from the test traffic, which encompasses one or more metrics related to the transmitted test traffic. These metrics are determined by a network traffic meter within the test package deployed on both the first and second edge network devices by the SD-WAN controller. The first and second edge network devices are configured to report data related to the sending and receiving of traffic flows to the SD-WAN controller, which then identifies values associated with the metrics. The network traffic meter is configured to facilitate the sending, reception, and measurement of data traffic flows according to instructions from the SD-WAN controller.

The collected metrics include measurements of loss, jitter, or latency of data traffic generated by either the first or second edge network device. After collecting these metrics, they are transmitted to the SD-WAN controller following a predetermined sleep period. The SD-WAN controller interfaces with one or more application programming interfaces (APIs) or a user interface to receive the request to configure the test package and provide the results of the collected metrics to an external system within the SD-WAN. Additionally, the SD-WAN controller interfaces with APIs or a user interface to deliver these metric results to a network administrator within the SD-WAN.

Figure 4:
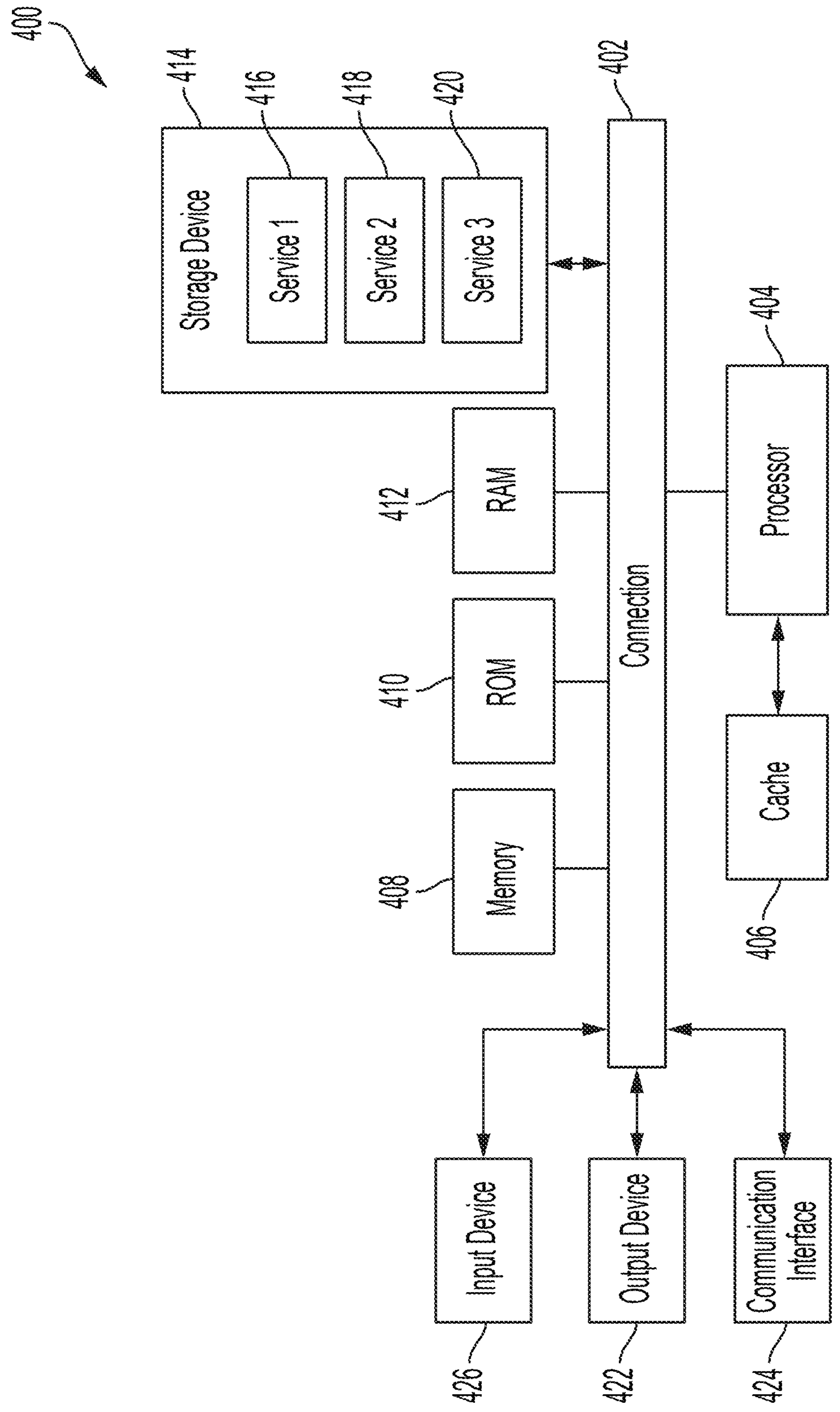
FIG. 4 illustrates an example of a computing system according to some aspects of the present technology.

FIG. 4 shows an example of computing system 400, which can be for example any computing device making up a system network, or any component thereof in which the components of the system are in communication with each other using connection 402. Connection 402 can be a physical connection via a bus, or a direct connection into processor 404, such as in a chipset architecture. Connection 402 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 400 includes at least one processing unit (central processing unit (CPU) or processor) and connection 402 that couples various system components including system memory 408, such as read-only memory (ROM) 410 and random access memory (RAM) 412 to processor 404. Computing system can include a cache of high-speed memory 408 connected directly with, in close proximity to, or integrated as part of processor 404.

Processor 404 can include any general-purpose processor and a hardware service or software service, such as services 416, 418, and 420 stored in storage device 414, configured to control processor 404 as well as a special-purpose processor where software instructions are incorporated into the actual processor design. Processor 404 may essentially be a completely self-contained computing system, containing multiple cores or processors, a bus, memory controller, cache 406, etc. A multi-core processor may be symmetric or asymmetric.

To enable user interaction, computing system 400 includes an input device 426, which can represent any number of input mechanisms, such as a microphone for speech, a touch-sensitive screen for gesture or graphical input, keyboard, mouse, motion input, speech, etc. Computing system 400 can also include output device 422, which can be one or more of a number of output mechanisms known to those of skill in the art. In some instances, multimodal systems can enable a user to provide multiple types of input/output to communicate with computing system 400. Computing system 400 can include communication interface 424, which can generally govern and manage the user input and system output. There is no restriction on operating on any particular hardware arrangement, and therefore the basic features here may easily be substituted for improved hardware or firmware arrangements as they are developed.

Storage device 414 can be a non-volatile memory device and can be a hard disk or other types of computer-readable media that can store data that are accessible by a computer, such as magnetic cassettes, flash memory cards, solid state memory devices, digital versatile disks, cartridges, random access memories (RAMs), read-only memory (ROM), and/or some combination of these devices.

The storage device 414 can include software services, servers, services, etc., and when the code that defines such software is executed by the processor 404, it causes the system to perform a function. In some embodiments, a hardware service that performs a particular function can include the software component stored in a computer-readable medium in connection with the hardware components, such as processor 404, connection 402, output device 422, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Although a variety of examples and other information was used to explain embodiments within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some clauses of the present technology include:

Clause 1. A method for performing testing of network deployment in a software defined wide area network (SD-WAN), the method comprising: receiving, by an SD-WAN controller, a request to configure a test package comprising a set of test instructions for transmitting test traffic between a first edge network device and a second edge network device; configuring, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitoring the test traffic between the first edge network device and the second edge network device, wherein monitoring includes collecting data from the test traffic, the data including one or more metrics related to the test traffic transmitted.

Clause 2. The method of clause 1, further comprising: instructing, by the SD-WAN controller, the first edge network device and the second edge network device to generate data traffic flows in accordance with the test package, wherein traffic flows of the test traffic are monitored to generate the one or more metrics related to the test traffic transmitted.

Clause 3. The method of clause 1, wherein the SD-WAN controller interfaces with one or more application programming interfaces (APIs) or a user interface to receive the request to configure the test package and to provide results of the one or more metrics to a network administrator in an SD-WAN.

Clause 4. The method of clause 1, wherein the one or more metrics are determined by a network traffic meter in the test package deployed on the first edge network device and the second edge network device by the SD-WAN controller, the network traffic meter configured to facilitate sending of data traffic flows, reception of the data traffic flows, and measure the data related to sending and receiving according to one or more instructions from the SD-WAN controller.

Clause 5. The method of clause 4, wherein the first edge network device and the second edge network device are configured to report the data related to the sending and the receiving of the data traffic flows to the SD-WAN controller to identify one or more values related to the one or more metrics.

Clause 6. The method of clause 1, wherein the one or more metrics include a measurement of loss, jitter or latency of data traffic generated by the first edge network device or the second edge network device.

Clause 7. The method of clause 1, further comprising: wherein the test traffic generated by the first edge network device is configured to simulate network, transport, and application layer protocols, and control a bit rate per second (bps) of the test traffic transmitted.

Clause 8. The method of clause 1, wherein instructing the first edge network device to conduct the test comprises: identifying a test command in the test package received from the SD-WAN controller over a management network path, the test command comprising a set of instructions for conducting the test along a multiprotocol label switching link (MPLS link) to the second edge network device; and sending the test traffic based on the test command to the second edge network device over the MPLS link, wherein the second edge network device is to forward the test traffic received to the test package stored at the second edge network device.

Clause 9. The method of clause 1, wherein instructing the first edge network device to conduct the test comprises: deploying the test package by the SD-WAN controller on the first edge network device and the second edge network device that includes a device configuration instruction; wherein the device configuration instruction instructs the first edge network device and the second edge network device to configure and deploy an SD-WAN that includes a data link between the first edge network device and the second edge network device; and implementing a routing policy that identifies a set of traffic to transmit over the data link to the second edge network device, wherein the routing policy instructs the second edge network device to identify an amount of the data received in the set of traffic.

Clause 10. The method of clause 1, further comprising: in response to collecting the one or more metrics related to the test traffic transmitted, transmitting to the SD-WAN controller the one or more metrics reported by the first edge network device and the second edge network device after a predetermined sleep time period.

Clause 11. A network device comprising: one or more memories having computer-readable instructions stored therein; and one or more processors configured to execute the computer-readable instructions to: receive, by an SD-WAN controller, a request to configure a test package comprising a set of test instructions for transmitting test traffic between a first edge network device and a second edge network device; integrating, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitor the test traffic between the first edge network device and the second edge network device, wherein monitoring includes collecting data from the test traffic, the data including one or more metrics related to the test traffic transmitted.

Clause 12. The network device of clause 11, further comprising: instructing, by the SD-WAN controller, the first edge network device and the second edge network device to generate data traffic flows in accordance with the test package, wherein the data traffic flows are monitored to generate the one or more metrics related to the test traffic transmitted.

Clause 13. The network device of clause 11, wherein the SD-WAN controller interfaces with one or more application programming interfaces (APIs) or a user interface to receive the request to configure the test package and to provide results of the one or more metrics to a network administrator in an SD-WAN.

Clause 14. The network device of clause 11, wherein instructing the first edge network device to conduct the test comprises: identifying a test command in the test package received from the SD-WAN controller over a management network path, the test command comprising a set of instructions for conducting the test along a multiprotocol label switching link (MPLS link) to the second edge network device; and sending the test traffic based on the test command to the second edge network device over the MPLS link, wherein the second edge network device is to forward the test traffic received to the test package stored at the second edge network device.

Clause 15. The network device of clause 11, wherein instructing the first edge network device to conduct the test comprises: deploying the test package by the SD-WAN controller on the first edge network device and the second edge network devices that includes a device configuration instruction; wherein the device configuration instruction instructs the first edge network device and the second edge network device to configure and deploy an SD-WAN that includes a data link between the first edge network device and the second edge network device; and implementing a routing policy that identifies a set of data traffic to transmit over the data link, wherein the routing policy instructs the second edge network device to identify an amount of the data received in the set of data traffic.

Clause 16. The network device of clause 11, further comprising: in response to generating the one or more metrics related to the test traffic transmitted, transmitting to the SD-WAN controller the one or more metrics reported by the first edge network device and the second edge network device after a predetermined sleep time period.

Clause 17. A non-transitory computer-readable storage medium comprising computer-readable instructions, which when executed by one or more processors of a network appliance, cause the network appliance to: receiving, by an SD-WAN controller, a request to configure a test package comprising a set of test instructions for transmitting test traffic between a first edge network device and a second edge network device; integrating, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitoring the test traffic between the first edge network device and the second edge network device, wherein monitoring includes collecting data from the test traffic, the data including one or more metrics related to the test traffic transmitted.

Clause 18. The non-transitory computer-readable storage medium of clause 17, wherein the one or more processors further cause the network appliance to: instructing, by the SD-WAN controller, the first edge network device and the second edge network device to generate data traffic flows in accordance with the test package, wherein the data traffic flows are monitored to generate the one or more metrics related to the test traffic transmitted.

Clause 19. The non-transitory computer-readable storage medium of clause 17, wherein the SD-WAN controller interfaces with one or more application programming interfaces (APIs) or a user interface to receive the request to configure the test package and to provide results of the one or more metrics to a network administrator in an SD-WAN.

Clause 20. The non-transitory computer-readable storage medium of clause 17, wherein instructing the first edge network device to conduct the test comprises: identifying a test command in the test package received from the SD-WAN controller over a management network path, the test command comprising a set of instructions for conducting the test along a multiprotocol label switching link (MPLS link) to the second edge network device; and sending the test traffic based on the test command to the second edge network device over the MPLS link, wherein the second edge network device is to forward the test traffic received to the test package stored at the second edge network device.

Clause 21. The non-transitory computer-readable storage medium of clause 17, wherein instructing the first edge network device to conduct the test comprises: deploying the test package by the SD-WAN controller on the first edge network device and the second edge network device that includes a device configuration instruction; wherein the device configuration instruction instructs the first edge network device and the second edge network device to configure and deploy an SD-WAN that includes a data link between the first edge network device and the second edge network device; and implementing a routing policy that identifies a set of traffic to transmit over the data link, wherein the routing policy instructs the second edge network device to identify an amount of the data received in the set of traffic.

Clause 22. The non-transitory computer-readable storage medium of clause 17, wherein the one or more processors further cause the network appliance to: in response to generating the one or more metrics related to the test traffic transmitted, transmitting to the SD-WAN controller the one or more metrics reported by the first edge network device and the second edge network device after a predetermined sleep time period.

What is claimed is:

1. A method comprising:

receiving, by an SD-WAN controller, a request to configure a test package comprising a set of test instructions for transmitting test traffic between a first edge network device and a second edge network device;

configuring, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitoring the test traffic between the first edge network device and the second edge network device, wherein monitoring includes collecting data from the test traffic, the data including one or more metrics related to the test traffic transmitted.

2. The method of claim 1, further comprising:

instructing, by the SD-WAN controller, the first edge network device and the second edge network device to generate data traffic flows in accordance with the test package, wherein traffic flows of the test traffic are monitored to generate the one or more metrics related to the test traffic transmitted.

3. The method of claim 1, wherein the SD-WAN controller interfaces with one or more application programming interfaces (APIs) or a user interface to receive the request to configure the test package and to provide results of the one or more metrics to a network administrator in an SD-WAN.

4. The method of claim 1, wherein the one or more metrics are determined by a network traffic meter in the test package deployed on the first edge network device and the second edge network device by the SD-WAN controller, the network traffic meter configured for sending of data traffic flows, receiving of the data traffic flows, and measure the data related to sending and receiving according to one or more instructions from the SD-WAN controller.

5. The method of claim 4, wherein the first edge network device and the second edge network device are configured to report the data related to the sending and the receiving of the traffic flows to the SD-WAN controller to identify one or more values related to the one or more metrics.

6. The method of claim 1, wherein the one or more metrics include a measurement of loss, jitter or latency of data traffic generated by the first edge network device or the second edge network device.

7. The method of claim 1, further comprising:

wherein the test traffic generated by the first edge network device is configured to simulate network, transport, and application layer protocols, and control a bit rate per second of the test traffic transmitted.

8. The method of claim 1, wherein instructing the first edge network device to conduct the test comprises:

identifying a test command in the test package received from the SD-WAN controller over a management network path, the test command comprising a set of instructions for conducting the test along a multiprotocol label switching link (MPLS link) to the second edge network device; and sending the test traffic based on the test command to the second edge network device over the MPLS link, wherein the second edge network device is to forward the test traffic received to the test package stored at the second edge network device.

9. The method of claim 1, wherein instructing the first edge network device to conduct the test comprises:

deploying the test package by the SD-WAN controller on the first edge network device and second edge network device that includes a device configuration instruction;

wherein the device configuration instruction instructs the first edge network device and the second edge network device to configure and deploy an SD-WAN that includes a data link between the first edge network device and the second edge network device; and implementing a routing policy that identifies a set of traffic to transmit over the data link to the second edge network device, wherein the routing policy instructs the second edge network device to identify data received in the set of traffic.

10. The method of claim 1, further comprising:

in response to collecting the one or more metrics related to the test traffic transmitted, transmitting to the SD-WAN controller the one or more metrics reported by the first edge network device and the second edge network device after a predetermined sleep time period.

11. A network device comprising:

one or more memories comprising computer-readable instructions; and one or more processors configured to execute the computer-readable instructions to:

receive, by an SD-WAN controller, a request to configure a test package comprising a set of test instructions for transmitting test traffic between a first edge network device and a second edge network device;

configuring, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitor the test traffic between the first edge network device and the second edge network device, wherein monitoring includes collecting data from the test traffic, the data including one or more metrics related to the test traffic transmitted.

12. The network device of claim 11, further comprising: instructing, by the SD-WAN controller, the first edge network device and the second edge network device to generate data traffic flows in accordance with the test package, wherein the data traffic flows are monitored to generate the one or more metrics related to the test traffic transmitted.

13. The network device of claim 11, wherein the SD-WAN controller interfaces with one or more application programming interfaces (APIs) or a user interface to receive the request to configure the test package and to provide results of the one or more metrics to a network administrator in an SD-WAN.

14. The network device of claim 11, wherein instructing the first edge network device to conduct the test comprises:

identifying a test command in the test package received from the SD-WAN controller over a management network path, the test command comprising a set of instructions for conducting the test along a multiprotocol label switching link (MPLS link) to the second edge network device; and sending the test traffic based on the test command to the second edge network device over the MPLS link, wherein the second edge network device is to forward the test traffic received to the test package stored at the second edge network device.

15. The network device of claim 11, wherein instructing the first edge network device to conduct the test comprises:

deploying the test package by the SD-WAN controller on the first edge network device and the second edge network devices that includes a device configuration instruction;

wherein the device configuration instruction instructs the first edge network device and the second edge network devices to configure and deploy an SD-WAN that includes a data link between the first edge network device and the second edge network devices; and implementing a routing policy that identifies a set of data traffic to transmit over the data link, wherein the routing policy instructs the second edge network device to identify the data received in the set of data traffic.

16. The network device of claim 11, further comprising:

in response to generating the one or more metrics related to the test traffic transmitted, transmitting to the SD-WAN controller the one or more metrics reported by the first edge network device and the second edge network device after a predetermined sleep time period.

17. A non-transitory computer-readable storage medium comprising computer-readable instructions, which when executed by one or more processors of a network appliance, cause the network appliance to:

receiving, by an SD-WAN controller, a request to configure a test package comprising a set of test instructions for transmitting test traffic between a first edge network device and a second edge network device;

configuring, by the SD-WAN controller, the test package at the first edge network device and the second edge network device, wherein the test package instructs the first edge network device and the second edge network device to conduct a test based on the set of test instructions in the test package and the test traffic, and is configured to conduct the test based on one or more configurations in the set of test instructions, wherein the set of test instructions includes instructions for scheduling the test to initiate at a specified time period; and monitoring the test traffic between the first edge network device and the second edge network device, wherein monitoring includes collecting data from the test traffic, the data including one or more metrics related to the test traffic transmitted.

18. The non-transitory computer-readable storage medium of claim 17, wherein the one or more processors further cause the network appliance to:

instructing, by the SD-WAN controller, the first edge network device and the second edge network device to generate data traffic flows in accordance with the test package, wherein the data traffic flows are monitored to generate the one or more metrics related to the test traffic transmitted.

19. The non-transitory computer-readable storage medium of claim 17, wherein the SD-WAN controller interfaces with one or more application programming interfaces (APIs) or a user interface to receive the request to configure the test package and to provide results of the one or more metrics to a network administrator in an SD-WAN.

20. The non-transitory computer-readable storage medium of claim 17, wherein instructing the first edge network device to conduct the test comprises:

identifying a test command in the test package received from the SD-WAN controller over a management network path, the test command comprising a set of instructions for conducting the test along a multiprotocol label switching link (MPLS link) to the second edge network device; and sending the test traffic based on the test command to the second edge network device over the MPLS link, wherein the second edge network device is to forward the test traffic received to the test package stored at the second edge network device.

* * * * *